(12) United States Patent
Gilmore et al.

(10) Patent No.: US 7,409,812 B2
(45) Date of Patent: Aug. 12, 2008

(54) ROBOTIC PACKAGING DEVICE AND METHOD

(75) Inventors: Scott C. Gilmore, Elgin, IL (US); Jason M. Ernst, Elgin, IL (US)

(73) Assignee: Smart Motion Robotics, Inc., Gilberts, IL (US)

( * ) Notice: Subject to any disclaimer, the term of this patent is extended or adjusted under 35 U.S.C. 154(b) by 0 days.

(21) Appl. No.: 11/478,059

(22) Filed: Jun. 29, 2006

(65) Prior Publication Data

US 2008/0000203 A1    Jan. 3, 2008

(51) Int. Cl.
*B65B 3/24* (2006.01)

(52) U.S. Cl. .............................. 53/475; 53/258; 53/473; 53/540

(58) Field of Classification Search .................. 53/473, 53/475, 139.5, 157, 532, 540, 541, 248, 255, 53/260; 294/87.12
See application file for complete search history.

(56) References Cited

U.S. PATENT DOCUMENTS

| | | | |
|---|---|---|---|
| 2,783,078 A | 2/1957 | Billner | |
| 4,192,121 A | 3/1980 | Caudle | |
| 4,553,691 A | 11/1985 | Morando | |
| 4,765,487 A | 8/1988 | Bliss | |
| 4,858,974 A | 8/1989 | Stannek | |
| 4,909,376 A * | 3/1990 | Herndon et al. | 198/395 |
| 5,112,181 A * | 5/1992 | Rasmussen | 414/416.07 |
| 5,403,056 A * | 4/1995 | Wallace | 294/98.1 |
| 5,463,847 A | 11/1995 | Alexander et al. | |
| 5,486,030 A | 1/1996 | Cobelo | |
| 5,506,682 A * | 4/1996 | Pryor | 356/623 |
| 5,553,442 A * | 9/1996 | Fadaie | 53/445 |
| 5,562,320 A | 10/1996 | Bloomberg et al. | |
| 5,758,474 A * | 6/1998 | Ziegler | 53/447 |
| 5,778,640 A * | 7/1998 | Prakken et al. | 53/475 |
| 6,056,341 A | 5/2000 | Bliss | |
| 6,237,978 B1 | 5/2001 | Bliss | |
| 6,371,717 B1 * | 4/2002 | Grams et al. | 414/416.09 |
| 6,591,580 B1 * | 7/2003 | Tharpe, Jr. | 53/139.5 |
| 6,662,529 B2 * | 12/2003 | Grano | 53/435 |
| 6,859,683 B2 * | 2/2005 | Parker et al. | 700/259 |
| 2002/0005646 A1 * | 1/2002 | Bliss et al. | 294/88 |

* cited by examiner

*Primary Examiner*—Hemant M. Desai
(74) *Attorney, Agent, or Firm*—Ryndak & Suri LLP

(57) ABSTRACT

An end of arm tool that is capable of handling fragile items such as eggs that are packaged in containers (e.g., egg cartons) that require special handling is provided. The end of arm tool comprises vacuum cup assemblies to grip the top surfaces of the packages, clamp fingers to clamp the edges of the packages, and optionally a pusher assembly to release the packages from the clamp fingers. In addition, a method of loading packages into cases using the end of arm tool apparatus of the present invention is provided. A gripper may be provided to place divider sheets between packages in the cases.

5 Claims, 5 Drawing Sheets

ROBOTIC PACKAGING DEVICE AND METHOD

FIELD OF THE INVENTION

The present invention relates to an end of arm tool for a robotic arm which is suitable for placing packages into cases, and a method of automating the process of placing packages into cases. Specifically, the present invention relates to an end of arm tool suitable for packing egg cartons into a shipper case and a method of using the end of arm tool to automate the process of packing egg cartons into a shipper case.

BACKGROUND OF THE INVENTION

The use of robotic arms has been readily adopted across diverse industries because they increase efficiency in the production process and reduce labor costs. The widespread use of robotic arms is due largely to their versatility of performing different tasks. This versatility is accomplished by the use of end of arm tools (EOATs) that are specifically designed to perform specialized tasks. For example, robotic arms are used to perform complex operations that require the highest degree of accuracy and precision, such as the manufacturing of circuit boards or computer chips. In other industries, robotic arms have replaced manual labor for tasks that were traditionally performed manually by humans such as packing bottles into shipper cases, painting automobiles on the assembly line, and many other similar tasks. All these tasks can be performed by end of arm tools that have been specifically designed to perform a task such as painting cars on the assembly line, soldering transistors onto circuit boards, and loading bottles into shipper cases.

Despite the many uses of robotic arms, there is still a need to provide an end of arm tool that is capable of handling fragile items that require special handling such as eggs that are packaged in containers (e.g., egg cartons) which are then placed in shipper cases. Heretofore, packing cartons of eggs into shipper cases has remained a manual task.

SUMMARY OF THE INVENTION

According to one aspect of the present invention, an end of arm tool comprises a plate having a top surface and a bottom surface. At least one clamp actuator is located on the bottom surface of the plate. The clamp actuator operates a clamp bar to which a plurality of clamp fingers is connected. A vacuum cup assembly is also located on the bottom surface of the plate.

In one embodiment of the present invention, the end of arm tool further comprises at least one release actuator located on the top surface of the plate that operates a pusher assembly located along the bottom surface of the plate.

In another aspect, the invention is an end of arm tool comprising gripping means for gripping a package by its top surface and clamping means for clamping the edges of the package. The end of arm tool may further comprise releasing means for releasing the package from the end of arm tool.

According to another aspect of the present invention, a method of packing cases is provided. The method comprises connecting an end of arm tool comprising a vacuum cup assembly and a plurality of clamp fingers to a robotic arm, and controlling the robotic arm to place the end of arm tool over a package so that the vacuum cup assembly makes contact with the top surface of the package. A vacuum is generated so that the vacuum cup assembly grips the top surface of the package. The clamp fingers are retracted to clamp the edges (e.g., the ends, or the ends and sides) of the package and the robotic arm is controlled to lift the package and carry the package to a case. The method further comprises moving the robotic arm into the case to place the package in the case, releasing the package, and moving the robotic arm out of the case.

In another aspect of the invention, a gripper is provided on the end of arm tool for picking up a divider sheet, such as a sheet of cardboard, and placing it in the case between layers or columns of cartons.

DETAILED DESCRIPTION OF THE INVENTION

Figure 1:
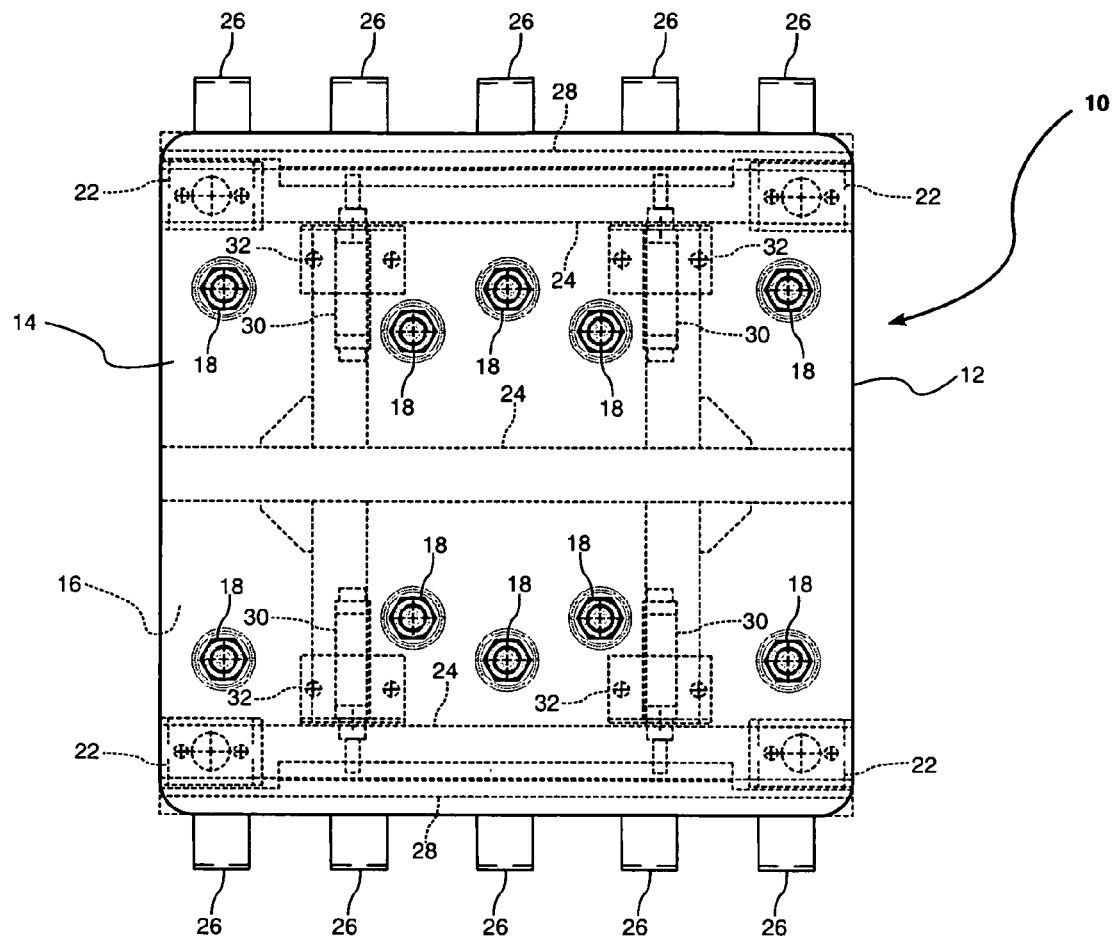
FIG. 1 is a detailed top view of the end of arm tool.
Figure 2:
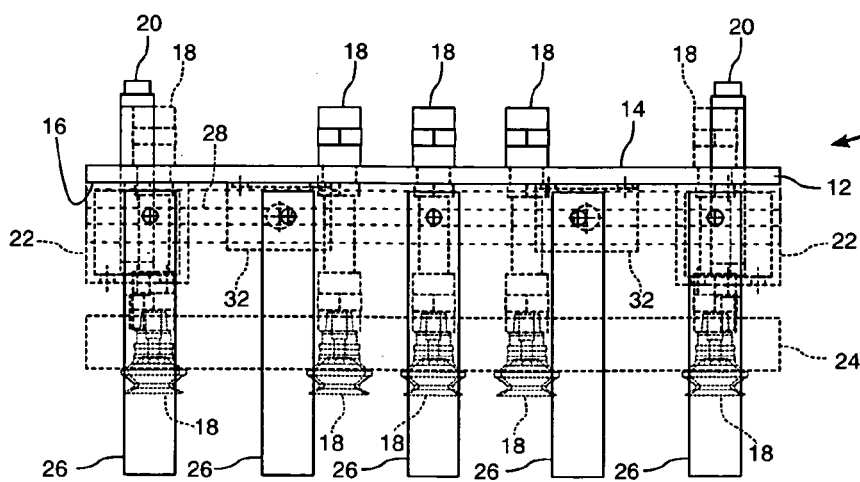
FIG. 2 is a front elevation view of the end of arm tool.
Figure 3:
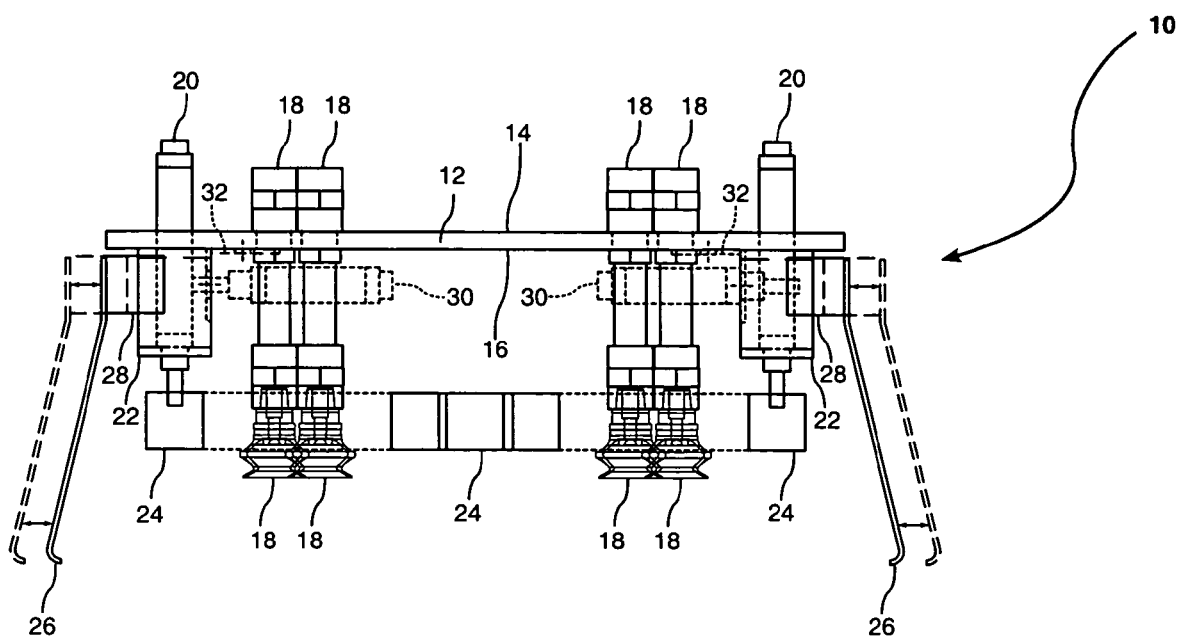
FIG. 3 is a side elevation view of the end of arm tool.

Referring to the figures generally and in particular to FIGS. 1 through 3, there is illustrated an end of arm tool (EOAT) 10 that can place packages containing fragile items in cases. End of arm tool 10 includes a main plate 12 having a top surface 14 and a bottom surface 16. Vacuum cup assemblies 18 are attached to plate 12 at top surface 14 and extend through bottom surface 16. Release actuators 20 are connected to a release actuator mount 22 that is connected to bottom surface 16 of plate 12. A pusher assembly 24 is attached to release actuator 20. Pusher assembly 24 is located substantially parallel to plate 12 below bottom surface 16. Clamp fingers 26 are connected to a clamp bar 28 that is operated by a clamp actuator 30. A clamp actuator bracket 32 attaches clamp actuator 30 to bottom surface 16 of plate 12.

The shape of plate 12 is typically a rectangle as shown. Those skilled in the art will appreciate that the shape and dimensions of plate 12 will depend on the particular application of the end of arm tool. For example, for an end of arm tool that is suitable for packing egg cartons in a shipper case, the dimensions of plate 12 are such that plate 12 will fit within the inner walls of the shipper case and can hold about three 12-egg cartons (six rows by six columns of eggs for a total of 36 eggs) or about two 18-egg cartons (six rows by six columns of eggs for a total of 36 eggs). For example, for such an application plate 12 may be a square having sides from about 9.5 inches to about 11 inches and more preferably from about 10 inches to about 10.5 inches.

Figure 7:
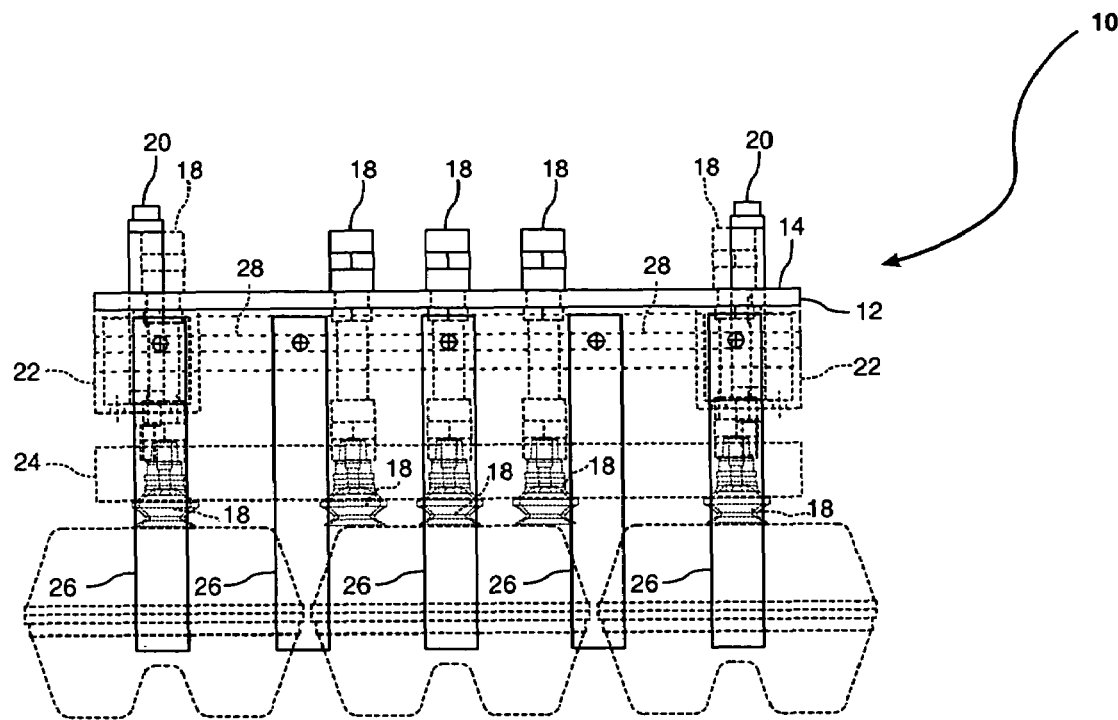
FIG. 7 is a front elevation view of the end of arm tool holding three 12-egg cartons.
Figure 8:
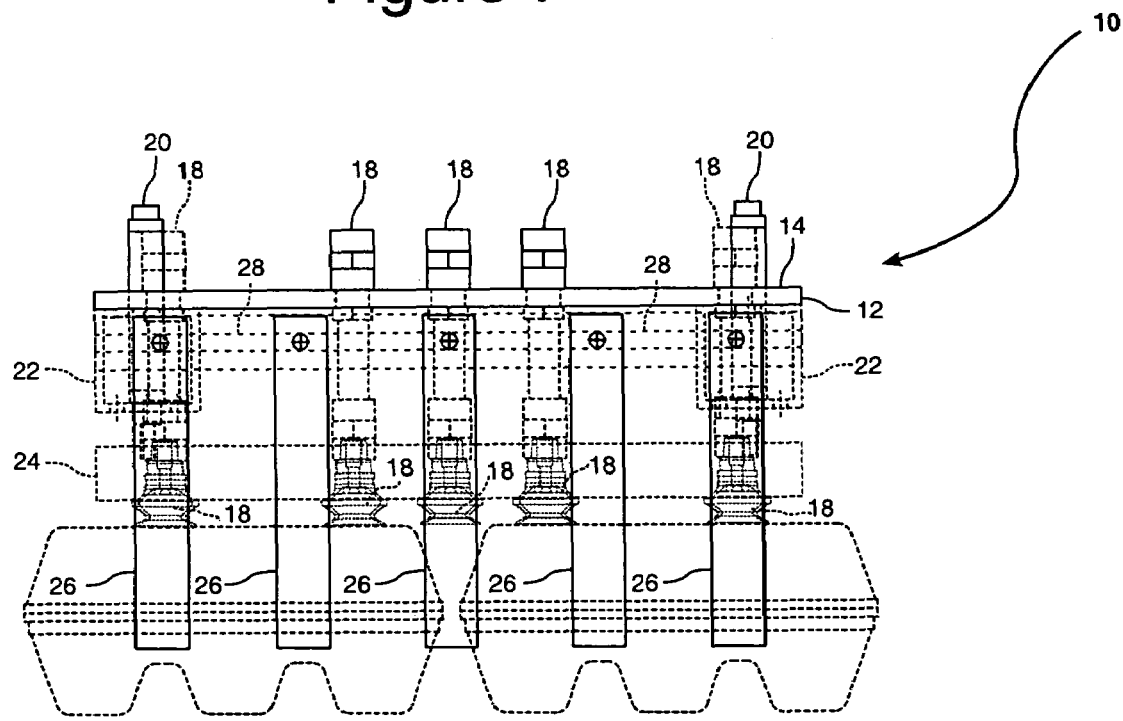
FIG. 8 is a front elevation view of the end of arm tool holding two 18-egg cartons.

As shown in FIG. 1, in the exemplary embodiment there are ten vacuum cup assemblies 18 arranged on plate 12. The number and configuration of vacuum cup assemblies 18 can vary depending on parameters such as the size, shape and weight of the items to be packed. The arrangement of vacuum cups 18 shown in FIG. 1 is designed to pick up three 12-egg cartons or two 18-egg cartons, as best seen in FIGS. 7 and 8.

Clamp fingers 26 are typically configured in pairs. In the exemplary embodiment shown there are five pairs of clamp fingers 26. Again, this arrangement is suitable for grasping the ends of three 12-egg cartons or two 18-egg cartons (see FIGS. 7 and 8), and the number and arrangement of clamp fingers 26 may be varied to suit the size and shape of the items to be packed. Each clamp finger 26 of a pair is attached to a corresponding clamp bar 28. Clamp bars 28 are located opposite each other substantially parallel to the front and back edge of plate 12. Each clamp bar 28 is operated by a pair of clamp actuators 30. Each clamp actuator 30 is attached to bottom surface 16 by a bracket 32. Clamp actuators 30 are preferably linear thrusters, but may also be pneumatic cylinders, hydraulic cylinders, or other similar devices known to those skilled in the art. Clamp fingers 26 are movable between two positions as shown in FIG. 3 (with the extended or open position shown in dashed lines).

Release actuators 20 are provided to operate pusher assembly 24. Release actuators 20 are preferably linear thrusters, but may also be pneumatic cylinders, hydraulic cylinders, or other similar devices known to those skilled in the art. Pusher assembly 24 can have any shape and/or form suitable to push on the top surface of the items currently held by clamp fingers 26 to release the items from end of arm tool 10. For example, pusher assembly 24 may be in the form of a pusher plate or one or more pusher bars.

Figures 4, 5:
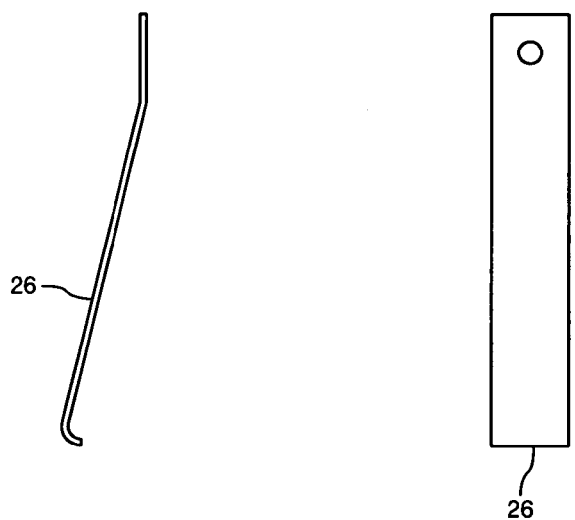
FIG. 4 is a side elevation view of a clamp finger.
FIG. 5 is a front elevation view of a clamp finger.

Referring now to FIGS. 4 and 5, each clamp finger 26 has a top section 34, a middle section 36, a bottom section 38, and a fastener hole 40. Each clamp finger 26 attaches to clamp bar 28 at top section 34 by means of a bolt or other fastener which is inserted through fastener hole 40. Bottom section 38 is preferably slightly curved at the tip to provide a hook to clamp onto the edge of the package. Clamp finger 26 is typically made of a suitable flexible material such as spring steel. Because clamp finger 26 is both thin and flexible, it slips easily between a carton and the inner wall of a case, and may be easily withdrawn after the carton is placed in the case.

Figure 6:
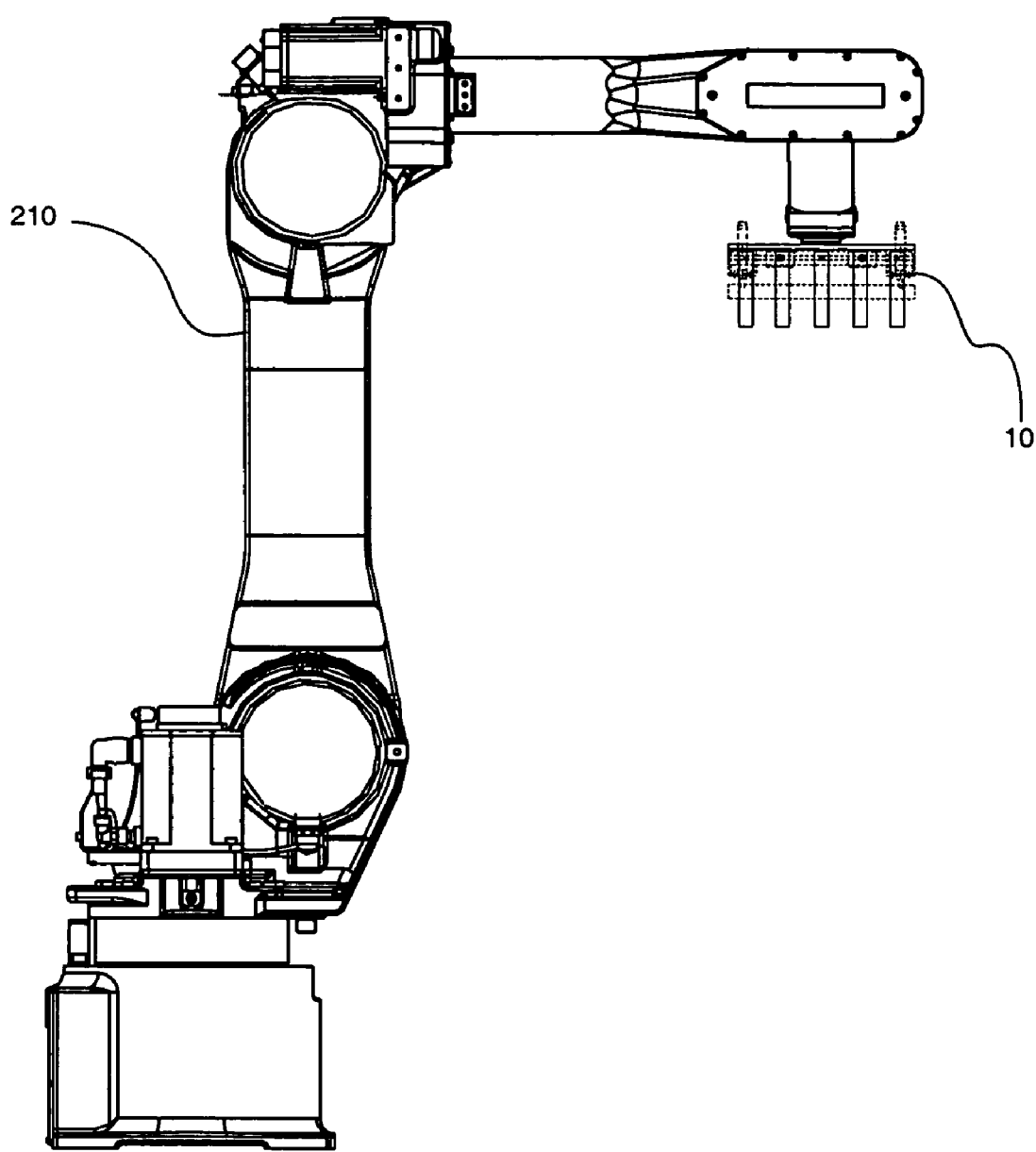
FIG. 6 is a side elevation view of a robotic arm having attached thereto an end of arm tool.

FIG. 6 illustrates a robotic arm 50 having attached thereto an end of arm tool 10. End of arm tool 10 is attached to the face plate 52 of robotic arm 50. FIG. 7 shows end of arm tool 10 lifting three 12-egg cartons, and FIG. 8 shows end of arm tool 10 lifting two 18-egg cartons. In FIGS. 7 and 8, the vacuum cups are seen in contact with the top surfaces of the egg cartons, and the clamp fingers are shown clamping the ends of the egg cartons.

More generally, end of arm tool 10 comprises a plate having a top surface and a bottom surface as previously described, gripping means attached to the bottom surface of the plate to grip the top surface of a package, and clamping means attached to the bottom surface of the plate to clamp the ends of a package. The gripping means may be any suitable device capable of engaging the top surface of the package and lifting the package, including, without limitation, the vacuum cup assembly described above and other such devices known to those skilled in the art. The clamping means may include any suitable device capable of holding the package together to prevent it from becoming open as the package is lifted by the robotic arm. Suitable clamping means include, without limitation, the clamp fingers connected to the clamp bar which is operated by the retractable means. The retractable means may include any suitable device capable of extending and retracting the clamp bar such as clamp actuators as described above and other such devices known to those skilled in the art.

The end of arm tool is preferably also provided with releasing means attached to the bottom surface of the plate to release the clamping means from the edges of the package. The releasing means can include any suitable device capable of disengaging the package from the end of arm tool. Examples of suitable releasing means include, without limitation, the vacuum cup assembly previously described wherein the air pressure can be reversed to "blow off" the package from the gripping means, a pusher assembly operated by pushing means, any other devices known to those skilled in the art, and combinations thereof. As used herein, the term "blow off" refers to applying positive air pressure such that the package becomes disengaged from the vacuum cup assemblies. The pushing means can include any suitable device capable of moving the pushing assembly below the ends of the clamp fingers. Suitable pushing means include, without limitation, release actuators as described above and other similar devices known to those skilled in the art. It will be apparent to those skilled in the art that the package can remain attached to the end of arm tool apparatus at the clamping means even though the package has been disengaged from the gripping means. The releasing means can include the combined operation of the vacuum cup assembly and the pusher assembly as previously described.

The method of the invention is performed by connecting an end of arm tool as described above to a robotic arm, and controlling the robotic arm to place the end of arm tool over a package so that the vacuum cup assembly makes contact with the top surface of the package. Next, a vacuum is generated so that the vacuum cup assembly grips the top surface of the package. Some packages such as egg cartons can become open in some instances when lifted by their tops, resulting in the undesired spillage of the contents of the packages (i.e., eggs). To prevent this undesired spillage, the method comprises retracting the clamp fingers to clamp the edges of the package. In a preferred embodiment of the present invention, the clamp fingers are placed in a manner such that the bottom-most part of the package can be grasped. The method further comprises controlling the robotic arm to lift the package and carry the package to a case, moving the robotic arm into the case to place the package in the case, releasing the package, and moving the robotic arm out of the case.

Releasing the package is preferably performed by reversing the air pressure in the vacuum cup assemblies to "blow off" the package from the vacuum cup assemblies, and/or by operating a pusher assembly to push the package off the clamp fingers to completely release the package from the end of arm tool.

Figure 9:
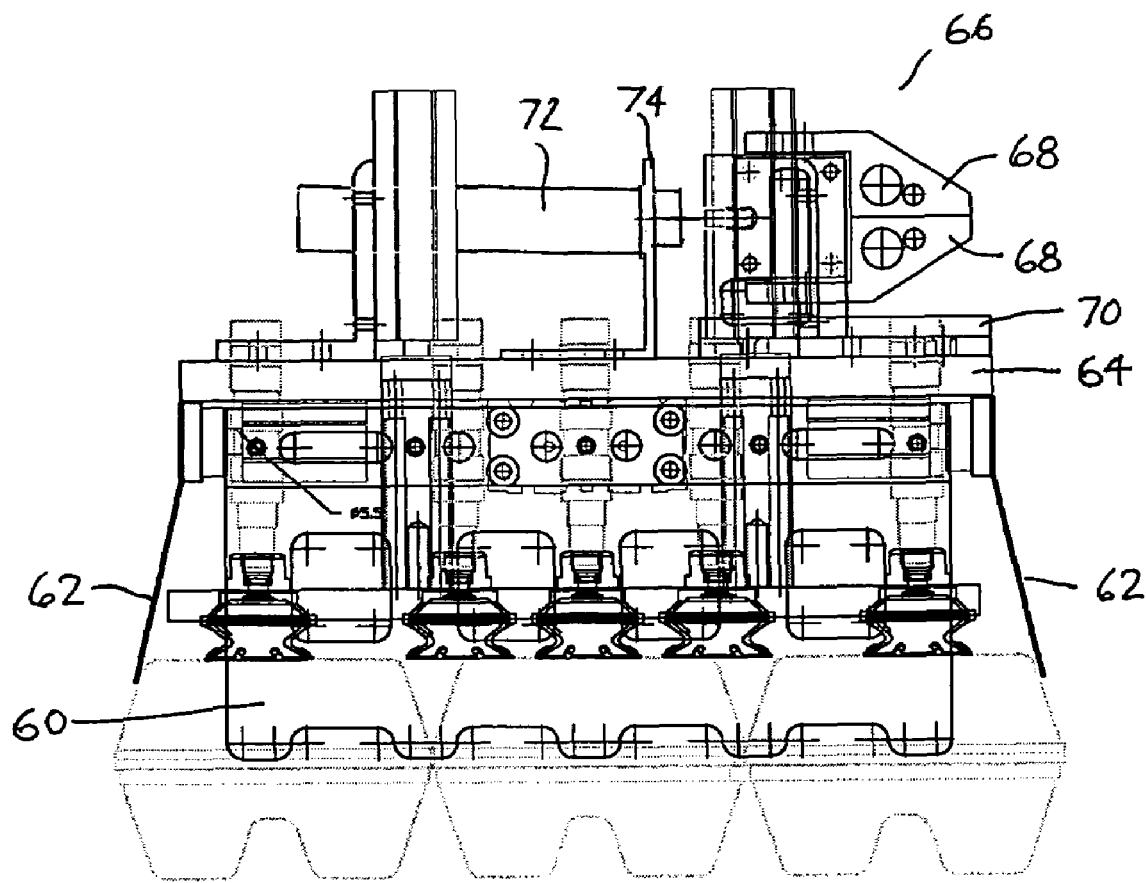
FIG. 9 is a front elevation view of another embodiment of the end of arm tool.

In an alternative embodiment, clamp fingers may be provided on all four sides of the main plate in order to clamp the packages on their sides as well as their ends. This provides additional protection against inadvertent opening of the cartons when they are picked up. As shown in FIG. 9, side clamp fingers 60 and end clamp fingers 62 are mounted on the sides and ends of main plate 64, respectively. Side clamp fingers 60 and end clamp fingers 62 may be separate and individual, as described above and shown in FIGS. 1 through 8, or may be formed as a unitary piece of material as is the case with side clamp fingers 60 shown in FIG. 9. The material is thin and flexible, such as 0.965 mm stainless steel.

In some applications, it is desirable to place a cardboard divider or slip sheet between columns of cartons in the shipper case. To automate the placement of the divider, a gripper 66 is provided. As shown in FIG. 9, gripper 66 includes a pair of gripper fingers 68. Gripper 66 is mounted on and moves laterally along gripper slide 70. Gripper 66 is operated by gripper actuator 72 which is attached to main plate 64 via gripper actuator bracket 74.

In operation, gripper 66 is moved outward along gripper slide 70 so as to extend beyond the edge of plate 64. Gripper fingers 68 are opened to pick up a single sheet of cardboard from a sheet feeder device (not shown). Gripper fingers 68 are then closed to grasp the sheet, and the robotic arm to which the end of arm tool is attached is operated to position the sheet in the case, whereupon gripper fingers 68 are opened to release the sheet in the desired position. Gripper 66 is then moved back along gripper slide 70 to its normal position. Gripper actuator 72 is preferably a linear thruster, but may also be a pneumatic cylinder, hydraulic cylinder, or other similar device.

EXAMPLE

An end of arm tool according to the invention was constructed for case packing of 36 eggs in either three 1-dozen cartons or two 1.5-dozen cartons. The end of arm tool was specifically designed to pick up plastic foam cartons off an in-feed conveyor and place them into one of three different shipper cases for shipment to grocery stores. The space utilized in the shipper cases is the same for either the three 1-dozen cartons or the two 1.5-dozen cartons. The three shipper cases sizes and configurations are as follows: (1) 15 dozen case—3 dozen per layer, 5 layers; (2) 24 dozen case—6 dozen per layer, 4 layers; and (3) 30 dozen case—6 dozen per layer, 5 layers. Shipper case sizes and dimensions may change from time to time, but do not alter the operation of the end of arm tool. The controller for the robotic arm may simply be reprogrammed for the different cases.

The EOAT was attached to the face plate of, and operated by, a Model M-6iB/6s six-axis robotic arm supplied by FANUC Robotics America, Inc. (Rochester Hills, Mich.). The structure, operation, programming and control of the robotic arm are well known in the art, and thus will not be described in detail herein. The mechanisms on the end of arm tool (i.e., clamp actuators, release actuators, gripper actuator) may be pneumatically actuated by electrically-operated pneumatic solenoids, which are remotely mounted. Commercial robotic arms provide the necessary electrical and pneumatic connections for the end of arm tool.

The end of arm tool included a substantially square plate measuring about 10.13 inches on each side. The plate was made of a one-quarter inch thick polycarbonate material. Ten vacuum cup assemblies were attached to the plate such that the vacuum cups were located on the bottom surface of the plate. A release actuator was mounted at each of the four corners of the plate using four release actuator mounts attached to the bottom surface of the plate. A pusher assembly was connected to the four release actuators. The pusher assembly comprised two outer bars and one inner bar. The two outer bars were connected each to two release actuators. In addition, there were two linking bars that connected the two outer bars to each other. The inner bar was attached to the linking bars between the two outer bars. The end of arm tool further comprised two clamp bars. Each clamp bar was connected to two clamp actuators. The clamp actuators were attached to the bottom surface of the plate using clamp actuator brackets. Five clamp fingers that were made of 0.0625 inch thick spring steel were attached to each clamp bar. The middle section of each clamp finger was approximately 3.23 inches long, and its curved bottom section formed a hook about 0.19 inches long with a radius of 0.12. These dimensions are suitable for gripping standard egg cartons.

A shipper case was packed with egg cartons using the end of arm tool described above. The end of arm tool was placed over the egg cartons by the robotic arm, i.e., centered directly over three 12-egg cartons or two 18-egg cartons, so that the vacuum cup assemblies made contact with the top surface of each egg carton. A pneumatic solenoid was actuated which pressurized a vacuum generator. The vacuum was supplied to the vacuum cup assemblies causing the vacuum cups to grip the top surface of each egg carton. After a short delay of about 0.5 seconds, the clamp fingers were retracted via the pneumatic clamp actuators and clamp bars so that the curved tips of the clamp fingers hooked underneath the center lip of the ends of the lower portions of the egg cartons. The clamp actuators were actuated to keep the clamp fingers normally extended. The open and closed positions of the clamp fingers may be seen in FIG. 3 (open position shown in dashed lines). The clamp fingers were used to prevent the egg cartons from becoming open as they were lifted by the vacuum cup assemblies.

After another short delay of about 0.5 seconds, the robotic arm lifted the egg cartons and moved them into the shipper case. As noted above, the clamp fingers used were made of spring steel so that the clamp fingers hooked to the edge of the egg cartons could easily fit in the narrow gap between the inside surface of the shipper case and the egg cartons without damaging either the egg cartons or shipper case. The robotic arm placed the egg cartons at the proper height location, depending on the layer count of the shipper case. Once in position, the vacuum solenoid was actuated to turn off the vacuum, and the air pressure was reversed to supply a positive air pressure to assist in releasing the vacuum cups from the tops of the egg cartons, i.e., to "blow off" the tops of the egg cartons. The clamp actuators were actuated causing them to extend and to move the clamp fingers to the open position. The inner surfaces of the shipper case normally prevent the fingers from opening sufficiently for the clamp fingers to completely release the egg cartons. Thus, the pusher assembly was used to force the egg cartons off the clamp fingers. Once the air pressure was reversed to the blow off mode and the clamp fingers were extended, the robotic arm moved up approximately one-half inch. The cartons had a tendency to come up with the robotic arm. The pusher assembly was actuated by a pneumatic solenoid that pressurized the release actuators so that they extended and pushed the pusher assembly downward, thus releasing the egg cartons from the clamp fingers. The normal state of the release actuators is retracted, that is, pusher assembly up.

After another short delay of approximately 0.5 seconds, the robotic arm moved the end of arm tool up and out of the shipper case, the "blow off" air was turned off and the pusher assembly was retracted to its normal position. The cycle was completed, and it was repeated until the shipper case was filled with egg cartons.

In an alternate method of operation, two layers of egg cartons were placed on one side of a shipper case as described above. The robotic arm was then moved to a cardboard sheet dispenser, and the gripper was operated to pick up a single sheet of cardboard from the dispenser by opening the gripper fingers, placing them over the end of the sheet, and closing them to grip the sheet. The robotic arm was operated to pull out the sheet, move it up and over the shipper case, orient it vertically, slip it into place in the case, and release it adjacent the egg cartons in the case. The arm was then operated as described above to fill the remaining space in the case with more egg cartons. As a result, the cardboard sheet was positioned as a vertical divider between columns of cartons. Of course, in other applications, a divider could be placed horizontally between layers of cartons if desired.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A method of packing a case comprising:
   connecting an end of arm tool comprising a vacuum cup assembly and a plurality of clamp fingers to a robotic arm;
   controlling the robotic arm to place the end of arm tool over a package so that the vacuum cup assembly makes contact with the top surface of the package and each clamp finger is adjacent an edge of the package;
   generating a vacuum so that the vacuum cup assembly grips the top surface of the package;
   retracting the clamp fingers to clamp at least two edges of the package;
   controlling the robotic arm to lift the package and carry the package to a case;
   moving the robotic arm into the case to place the package in the case;
   releasing the package from the vacuum cup assembly and the clamp fingers; and
   moving the robotic arm out of the case.

2. The method of claim 1 wherein the step of releasing the package comprises creating a positive air pressure in the vacuum cup assembly to blow off the top surface of the package from the vacuum cup assembly.

3. The method of claim 2 wherein the step of releasing the package further comprises operating a pusher assembly to push the package off the clamp fingers to completely release the package from the end of arm tool.

4. The method of claim 1 wherein the end of arm tool further comprises gripper means, further comprising:
   repeating the steps of claim 1 to place a plurality of packages in the case;
   providing at least one divider sheet; and
   controlling the robotic arm and operating the gripper means to place at least one divider sheet between columns of packages in the case.

5. The method of claim 1 wherein the package is an egg carton.

* * * * *